United States Patent [19]
Brkovic et al.

[11] Patent Number: 5,986,902
[45] Date of Patent: Nov. 16, 1999

[54] INTEGRATED PROTECTION CIRCUIT, METHOD OF PROVIDING CURRENT-LIMITING AND SHORT-CIRCUIT PROTECTION AND CONVERTER EMPLOYING THE SAME

[75] Inventors: Milivoje Slobodan Brkovic, Plano; Milan Stefanovic, Dallas, both of Tex.

[73] Assignee: Lucent Technologies Inc., Murray Hill, N.J.

[21] Appl. No.: 09/097,970

[22] Filed: Jun. 16, 1998

[51] Int. Cl.$^6$ .................................. G05F 1/56; H02H 7/10
[52] U.S. Cl. ............................ 363/50; 323/276; 323/277; 323/285
[58] Field of Search .................................. 363/50, 56, 55; 323/282, 285, 275, 276, 277

[56] References Cited

U.S. PATENT DOCUMENTS

| | | | |
|---|---|---|---|
| 4,733,104 | 3/1988 | Steigerwald et al. | 307/260 |
| 5,680,034 | 10/1997 | Redl | 363/21 |
| 5,687,066 | 11/1997 | Cook, II | 363/89 |

*Primary Examiner*—Adolf Deneke Berhane

[57] ABSTRACT

For use with a power converter having a current sensor that senses an output current of the converter and generates a proportional voltage and a controller having an overvoltage protection circuit associated therewith. The overvoltage protection circuit includes a voltage sense input coupled to an output of the converter and a first reference voltage input, an integrated protection circuit, method of providing current-limiting and short-circuit protection and power converter employing the same. In one embodiment, the integrated protection circuit includes an operation amplifier circuit, coupled between the current sensor and the controller, that generates a voltage signal and causes the controller to limit a current supplied by the converter to the output when the proportional voltage exceeds a second reference voltage. The integrated protection circuit also includes a conductive path, coupled between the operational amplifier circuit and the overvoltage protection circuit, that provides a path to apply the voltage signal to the voltage sense input when the proportional voltage exceeds the second reference voltage. The overvoltage protection circuit causes the controller to disable the converter when a voltage sensed at the voltage sense input exceeds a first reference voltage by a specified value. The integrated protection circuit thereby provides current-limiting and short-circuit protection for the converter.

21 Claims, 2 Drawing Sheets

5,986,902

INTEGRATED PROTECTION CIRCUIT, METHOD OF PROVIDING CURRENT-LIMITING AND SHORT-CIRCUIT PROTECTION AND CONVERTER EMPLOYING THE SAME

TECHNICAL FIELD OF THE INVENTION

The present invention is directed, in general, to power conversion and, more specifically, to an integrated protection circuit, method of providing current-limiting and short-circuit protection and power converter employing the same.

BACKGROUND OF THE INVENTION

During normal operation, various conditions may cause a power supply to experience dangerously increased output voltages and currents. In such a dangerous situation, the overload can severely damage or destroy electronic components or even the entire power supply. In response, most switching and linear power supplies possess output safeguards to protect power supplies from voltage and current overloads. Basically, external electronic circuits must sense the output of the power supply and react accordingly. In cases of above normal currents, circuits must limit the output current to a certain acceptable level or shut down the power supply in case of short circuit or heavy overload. Further, circuits monitor the output voltage and disable the power supply when necessary.

For those independent functions, current limiting (light overload as part of normal operation) and short-circuit (heavy overload) protection, multiple functional circuits are needed. Usually, current limiting is performed with operational amplifiers to maintain maximum output current (i.e., a first current threshold). A current limiting circuit is usually coupled to the power supply and merges into the output voltage feedback control loop. Once the output current rises above the first current threshold, the circuit lowers the output current by lowering the output voltage through a controller circuit.

If, for any reason, output current of the power supply goes high enough to damage the supply, prudence stipulates automatic power supply shut-down. Such a shut-down function engages when the output current rises above a previously set maximum overload current (i.e., a second current threshold). Upon sensing the unacceptable rise in the output current by a comparator, the independent shut-down circuit disables the power supply.

Additionally, overvoltage protection is employed for the power supply output to prevent the destruction of the supplied equipment do to malfunction of the power supply itself. As an independent function, the overvoltage protection requires a separate protection circuit. This protection is usually accomplished by a comparator set to trigger at a slightly higher than nominal output voltage (i.e., 15%–20% higher than the nominal output voltage). In cases of overvoltage, power supply is either shut-down and allowed to restart in a "hiccup" mode, or is latched until the input power is turned off and turn-on again, depending on the particular application.

Discrete or integrated controllers of linear or switching power supplies, usually implement some of the aforementioned protection features. In common switching power supplies, a feedback controller integrated circuit contains an internal overvoltage protection comparator, set to 115%–120% of the nominal output voltage. Therefore, when the internal overvoltage protection circuit senses overvoltage, the comparator will shut-down the power supply and restart it in a "hiccup" mode. Therefore, for the overvoltage protection, output current limiting and short-circuit current protection, multiple functional independent circuits must be added externally to the power supply.

Accordingly, what is needed in the art is circuit that functions to limit a power supply output current or shut down the power supply under short-circuit conditions.

SUMMARY OF THE INVENTION

To address the above-discussed deficiencies of the prior art, the present invention provides an integrated protection circuit, a method of providing current-limiting and short-circuit protection and a power converter employing the same. The integrated protection circuit is designed for use with a power converter having a current sensor that senses an output current of the converter and generates a proportional voltage and a controller having an overvoltage protection circuit associated therewith. The overvoltage protection circuit includes a voltage sense input coupled to an output of the converter and a first reference voltage input. In one embodiment, the integrated protection circuit includes an operation amplifier circuit, coupled between the current sensor and the controller, that generates a voltage signal and causes the controller to limit a current supplied by the converter to the output when the proportional voltage exceeds a second reference voltage. The integrated protection circuit also includes a conductive path, coupled between the operational amplifier circuit and the overvoltage protection circuit, that provides a path to apply the voltage signal to the voltage sense input when the proportional voltage exceeds the second reference voltage. The overvoltage protection circuit causes the controller to disable the converter when a voltage sensed at the voltage sense input exceeds a first reference voltage by a specified value. The integrated protection circuit thereby provides current-limiting and short-circuit protection for the converter.

The present invention therefore introduces the broad concept of combining the current-limiting and short-circuit functions in an integrated protection circuit. To accomplish the aforementioned functions, a conductive path is established between the operational amplifier circuit and the overvoltage protection circuit. The conductive path provides a channel for the voltage signal from the operational amplifier circuit when the proportional voltage exceeds the second reference voltage. Consequently, the overvoltage protection circuit may be employed to cause the controller to disable the converter when the voltage sensed (including the voltage signal from the operational amplifier circuit) at the voltage sense input thereof exceeds the first reference voltage by a specified limit.

In one embodiment of the present invention, the conductive path includes a diode that is forward biased when the proportional voltage exceeds the second reference voltage. In an embodiment to be illustrated and described, the conductive path includes a plurality of diodes. Thus, the diode(s) only allow the voltage signal to be applied to the voltage sense input of the overvoltage protection circuit when the proportional voltage exceeds the second reference voltage. Otherwise, the diode(s) isolate the overvoltage protection circuit from the operational amplifier circuit. Of course, other devices such as a switch may be employed in lieu of the diode(s).

In one embodiment of the present invention, the conductive path includes a delay circuit that delays application of the voltage signal to the overvoltage protection circuit for a specified period of time. Thus, the delay circuit delays activation of the short-circuit protection for a specified period to accommodate events such as the start-up of the power converter. While the delay circuit to be illustrated and described is embodied in a resistor-capacitor (RC) time constant circuit, other delay circuits are within the broad scope of the present invention.

In one embodiment of the present invention, the operational amplifier circuit further includes a series-coupled diode and resistor. In an embodiment to be illustrated and described, the series-coupled diode and resistor are coupled to the controller and the output of the converter. The series-coupled diode and resistor, however, are not necessary for the broad scope of the present invention.

In one embodiment of the present invention, integrated protection circuit further includes a latch circuit coupled to the overvoltage protection circuit. The latch circuit enables latching the overvoltage protection and short-circuit protection for a specified period of time. While the latch circuit to be illustrated and described includes a diode, other latch circuits are also applicable.

In one embodiment of the present invention, the integrated protection circuit further includes a resistor divider network coupled between the output of the converter and the operational amplifier circuit. The resistor network further defines a voltage and associated current to enable the short-circuit protection for the integrated protection circuit. Of course, other circuits or networks capable of accomplishing an analogous function are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
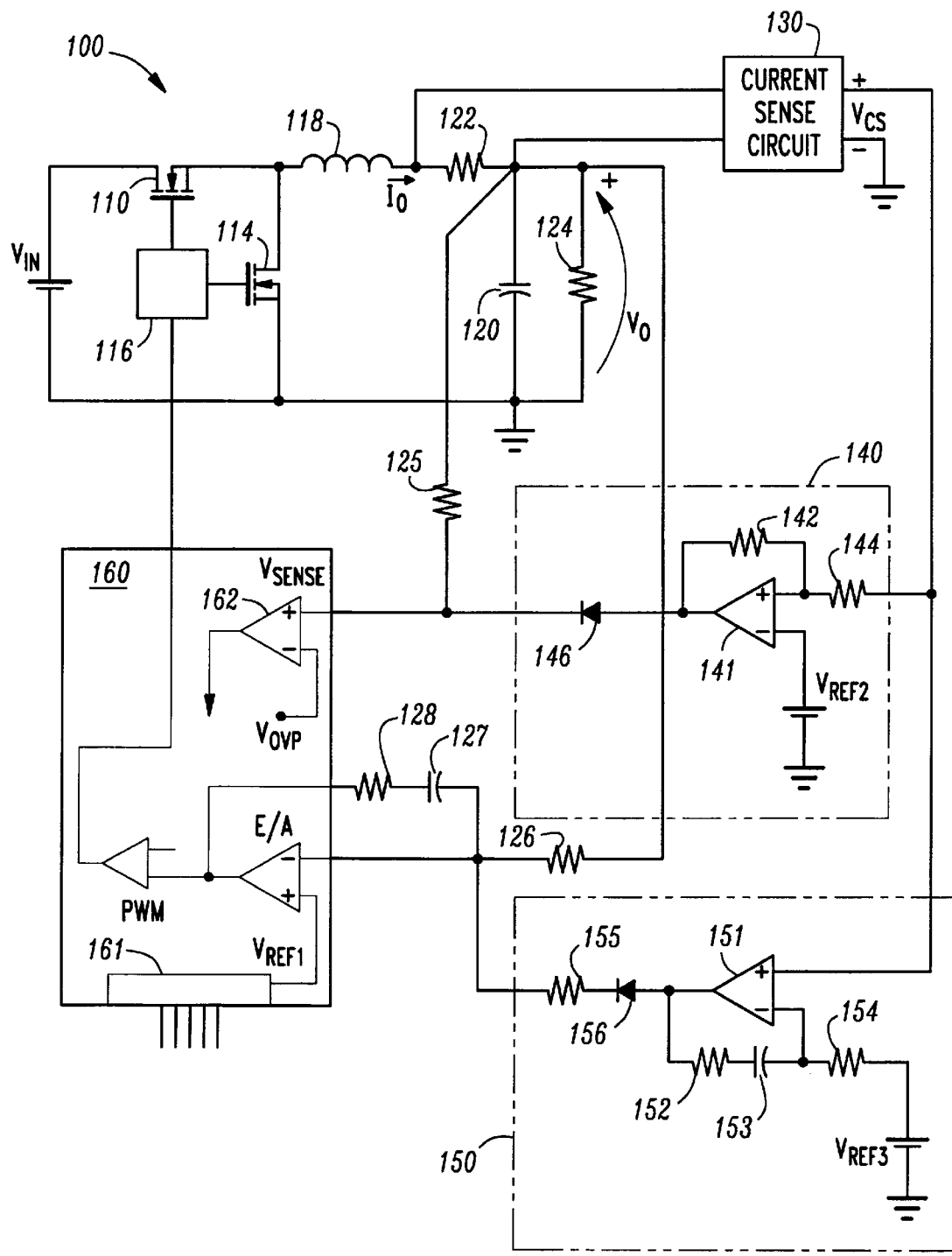
FIG. 1 illustrates a schematic diagram of a prior art switched-mode power converter.

Referring initially to FIG. 1, illustrated is a schematic diagram of a prior art switched-mode power converter. The power converter 100 receives DC power from a DC source $V_{in}$. The DC source $V_{in}$ is coupled to a switching network that includes a first switch 110, a second switch 114 and a driver circuit 116 for driving the switches 110, 114. An output inductor 118 is coupled to the first switch 110 and a sense resistor 122. The sense resistor 122 is further coupled to an output capacitor 120 that is tied to ground. A load 124 is coupled in parallel with the output capacitor 120. A converter output voltage $V_o$ is measured across load 124.

A conventional feedback controller 160 is coupled to the switching network and delivers control signals to the driver circuit 116. The controller 160 includes an error amplifier E/A, a pulse-width modulator PWM, an associated overvoltage protection circuit and an internal programmable digital-to-analog converter 161 for producing a user-selectable first reference voltage $V_{ref1}$. The overvoltage protection circuit includes an overvoltage comparator 162. An overvoltage resistor 125 is coupled between the positive terminal of the output and the noninverting input of the overvoltage comparator 162, also referred to as a voltage sense input $V_{sense}$. A protection voltage $V_{ovp}$ is commonly defined as the first reference voltage $V_{ref1}$ plus a specified value, commonly about 15% to about 20%. The protection voltage $V_{ovp}$ is supplied by the controller 160 to the inverting input of the overvoltage comparator 162 for comparison with output voltages from the power converter 100. The overvoltage comparator 162 monitors the converter output voltage $V_o$ at its voltage sense input $V_{sense}$. When the converter output voltage $V_o$ rises above the protection voltage $V_{ovp}$, the output of the overvoltage comparator 162 goes high and shuts down the controller and accordingly, the entire power converter 100.

Additionally, a first voltage feedback resistor 126 is coupled from the positive terminal of the output to the error amplifier E/A. A second voltage feedback resistor 128 and a voltage feedback capacitor 127 are further coupled to the error amplifier E/A for negative feedback control.

This prior art power converter 100 further includes a conventional current sensor 130, a short-circuit protection circuit 140 and a current limiting circuit 150. The current sensor 130 merely senses the current passing through the sense resistor 122 and produces a proportional voltage output $V_{cs}$ that is utilized by the short-circuit protection circuit 140 and the current limiting circuit 150.

The short-circuit protection circuit 140 consists of a first op-amp 141 that compares the proportional voltage output $V_{cs}$ to a second reference voltage $V_{ref2}$. A first scaling resistor 144 is coupled between the output of the current sensor 130 and the noninverting input of the first op-amp 141 and a first feedback resistor 142 is coupled between the output and the noninverting input of the first op-amp 141 to provide positive feedback control. Additionally, the second reference voltage $V_{ref2}$ is coupled to the inverting input of the first op-amp 141 for comparison with the proportional voltage $V_{cs}$. Finally, a first diode 146 is coupled between the output of the first op-amp 141 and the noninverting input of the overvoltage comparator 162.

The current limiting circuit 150 consists of a second op-amp 151 that compares the proportional voltage output $V_{cs}$ to a third reference voltage $V_{ref3}$. A second scaling resistor 154 is coupled between the third reference voltage $V_{ref3}$ and the inverting input of the second op-amp 151 and a series-coupled second feedback resistor 152 and feedback capacitor 153 are coupled between the output and the inverting input of the second op-amp 151 to provide negative feedback. Finally, a series-coupled second diode 156 and output resistor 155 are coupled between the output of the second op-amp 151 and the error amplifier E/A within the controller 160.

The basic operation of this circuit includes using the short-circuit protection circuit 140 and the current limiting circuit 150 to sense the output current of the power converter 100 and thereby limit it to an acceptable level or shut-down the entire converter, protecting the various components from overload and short circuits.

The short-circuit protection circuit 140 functions by comparing the proportional current $V_{cs}$ with the second reference voltage $V_{ref2}$ and subsequently shutting down the power converter 100 when necessary. When the proportional voltage $V_{cs}$ is greater than the second reference voltage $V_{ref2}$, the output of the second op-amp 141 will deliver a high voltage to the overvoltage comparator 162. Once the voltage at the noninverting input of the overvoltage comparator 162 rises above the compared protection voltage $V_{ovp}$, the output of the overvoltage comparator 162 will rise, thus, disabling the controller and hence, the entire power converter 100.

The current limiting circuit 150 functions by comparing the proportional voltage $V_{cs}$ with the third reference voltage $V_{ref3}$ and limiting the output current of the power converter 100 when above a preselected limit. When the proportional voltage $V_{cs}$ is greater than the third reference voltage $V_{ref3}$, the increased output voltage of the third op-amp 151 will limit the output current $I_o$ by way of the first voltage feedback resistor 126 and the output resistor 155, which form a resistor divider.

Again, for the overvoltage protection, output current limiting and short-circuit current protection, multiple functional independent circuits must be added externally to the power converter.

Figure 2:
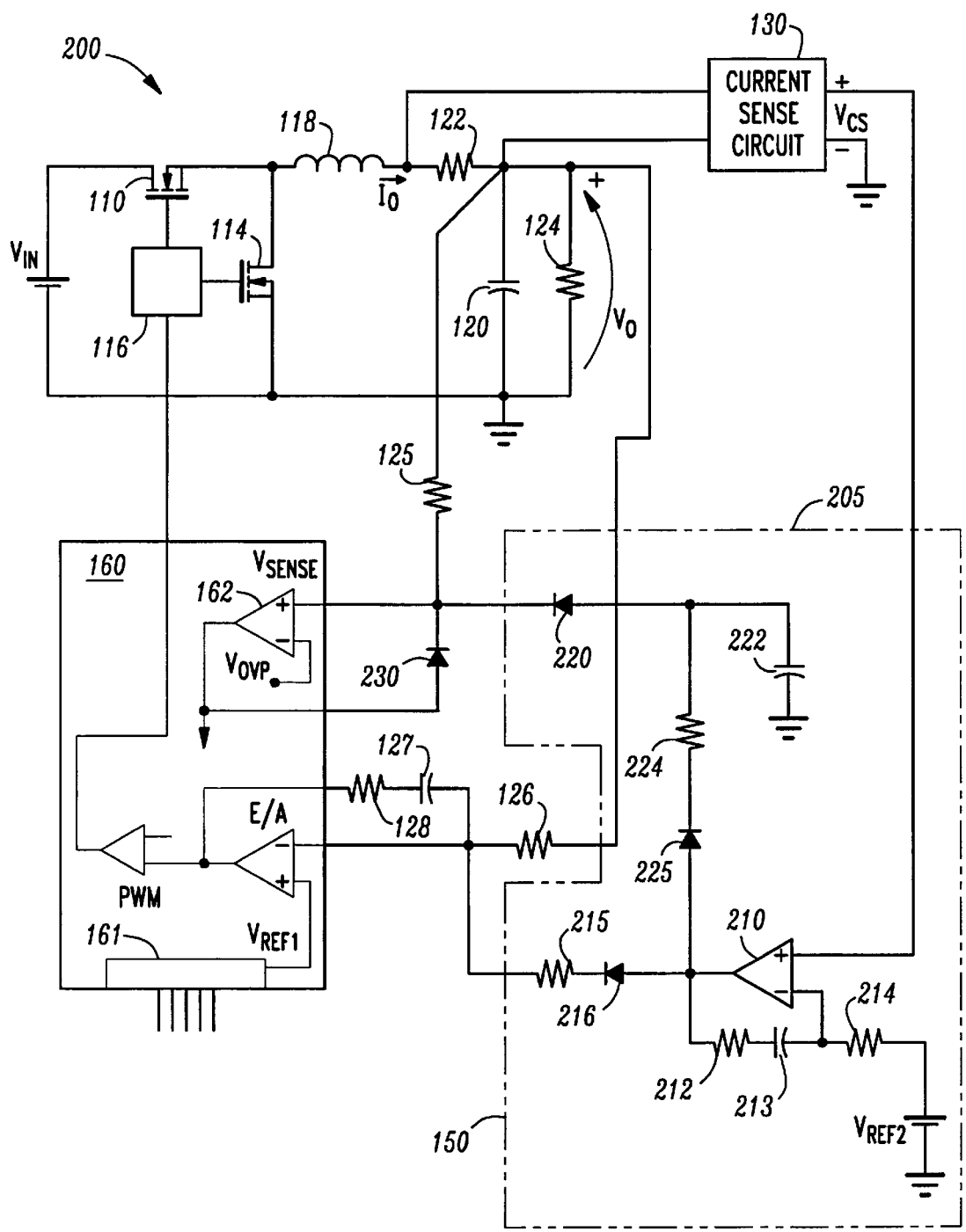
FIG. 2 illustrates a schematic diagram of a switched-mode power converter employing an embodiment of an integrated protection circuit constructed according to the principles of the present invention.

Turning now to FIG. 2, illustrated is a schematic diagram of a switched-mode power converter 200 employing an analogous switching network, controller and current sensor disclosed in FIG. 1 and employing an embodiment of an integrated protection circuit 205 constructed according to the principles of the present invention. As the switching network, controller 160 and current sensor 130 employed in this embodiment are analogous to those specified in FIG. 1, the operation thereof will not hereinafter be described in detail.

The integrated protection circuit 205 includes an operational amplifier circuit, coupled between the current sensor 130 and the controller 160. The operational amplifier circuit includes an op-amp 210 that compares the proportional voltage output $V_{cs}$ to a second reference voltage $V_{ref2}$. A scaling resistor 214 is coupled between the second reference voltage $V_{ref2}$ and the inverting input of the op-amp 210 and a series-coupled feedback resistor 212 and feedback capacitor 213 are coupled between the output and the inverting input of the op-amp 210 to provide negative feedback control. Further, a series-coupled first diode 216 and output resistor 215 are coupled between the output of the op-amp 210 and the error amplifier E/A within the controller 160.

The integrated protection circuit 205 further includes a conductive path coupled between the op-amp 210 and the voltage sense input $V_{sense}$ of the overvoltage comparator 162. The conductive path includes a second diode 225 coupled to a shut-down resistor 224 that is further coupled to a third diode 220. The third diode 220 is coupled to the voltage sense input $V_{sense}$ of the overvoltage comparator 162. Finally, a shut-down capacitor 222 is also coupled to the third diode 220.

This integrated protection circuit 205 combines the functions of two different prior art circuits in a fashion not found previously. The circuit 205 limits the output current by comparing the proportional voltage $V_{cs}$ with the second reference voltage $V_{ref2}$ and limiting the power converter output current $I_o$ when above a preselected limit. When the proportional voltage $V_{cs}$ is greater than the second reference voltage $V_{ref2}$, the op-amp 210 will generate a voltage signal that causes the controller 160 to limit the converter output current $I_o$. More precisely, the increased output voltage of the op-amp 210 will limit the output current $I_o$ through the controller 160 by way of the first voltage feedback resistor 126 and the output resistor 215, which form a resistor divider.

Additionally, the integrated protection circuit 205 provides short-circuit protection by shutting down the power converter 200 in situations of extremely high output currents $I_o$ by way of the conductive path. As in its current limiting function, when the proportional voltage $V_{cs}$ is greater than the second reference voltage $V_{ref2}$, the output voltage of the op-amp 210 increases, causing the second and third diodes 225, 220 to be forward biased. Once the diodes 225, 220 are conducting, the op-amp 210 delivers a positive voltage signal to the voltage sense input $V_{sense}$ of the overvoltage comparator 162. Once the voltage at the noninverting input of the overvoltage comparator 162 becomes higher than the protection voltage $V_{ovp}$, the output of the overvoltage comparator 162 will become positive and disable the controller 160 and hence, the entire power converter 200.

The shut-down resistor 224 and the overvoltage resistor 125 together form a resistor divider network that is coupled between the output of the converter and the op-amp 210. The resistor network functions to further define a voltage and associated current to enable the overvoltage protection circuit to interact with the integrated protection circuit 205.

Occasionally, during various operating conditions, the output current $I_o$ might develop spikes or short-term increases. In such cases, the power converter does not necessarily need to be shut-down. Therefore, the conductive path includes a delay circuit that includes the shut-down resistor 224 and the shut-down capacitor 222. The shut-down resistor 224 and the shut-down capacitor 222 work in conjunction as an RC filter with a known time constant. This filter enables delayed activation of the short-circuit protection during short duration heavy overloads, such as charging the output capacitor 120 during power converter start-up.

Optionally, a latch circuit, including a latch diode 230, is coupled to the overvoltage protection circuit between the output and the voltage sense input $V_{sense}$ of the overvoltage comparator 162. Once the output of the overvoltage comparator 162 goes high, whether from an overvoltage condition or a short-circuit condition, the overvoltage comparator 162 will be latched on, thus keeping the converter disabled, until power to the converter is cycled.

While specific embodiments of an integrated protection circuit have been illustrated and described, other embodiments are well within the broad scope of the present invention. Additionally, any converter topology is well within the broad scope of the present invention. For a better understanding of converters and control thereof, see *Power Supply Cookbook* by Marty Brown, Butterworth-Heinemann (1994), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power converter having a current sensor that senses an output current of said converter and generates a proportional voltage and a controller having an overvoltage protection circuit associated therewith, said overvoltage protection circuit having a voltage sense input coupled to an output of said converter and a first reference voltage input adapted to receive a first reference voltage, an integrated protection circuit, comprising:

an operation amplifier circuit, coupled between said current sensor and said controller, that generates a voltage signal and causes said controller to limit a current supplied by said converter to said output when said proportional voltage exceeds a second reference voltage; and a conductive path, coupled between said operational amplifier circuit and said overvoltage protection circuit, that provides a path to apply said voltage signal to said voltage sense input when said proportional voltage exceeds said second reference voltage, said overvoltage protection circuit causing said controller to disable said converter when a voltage sensed at said voltage sense input exceeds said first reference voltage by a specified value, said integrated protection circuit thereby providing current-limiting and short-circuit protection for said converter.

2. The integrated protection circuit as recited in claim 1 wherein said conductive path comprises a diode that is forward biased when said proportional voltage exceeds said second reference voltage.

3. The integrated protection circuit as recited in claim 1 wherein said conductive path comprises a plurality of diodes.

4. The integrated protection circuit as recited in claim 1 wherein said conductive path comprises a delay circuit that delays application of said voltage signal to said overvoltage protection circuit for a specified period of time.

5. The integrated protection circuit as recited in claim 1 wherein said operational amplifier circuit further comprises a series-coupled diode and resistor.

6. The integrated protection circuit as recited in claim 1 further comprising a latch circuit coupled to said overvoltage protection circuit.

7. The integrated protection circuit as recited in claim 1 further comprising a resistor divider network coupled between said output of said converter and said operational amplifier circuit.

8. For use with a power converter having a current sensor that senses an output current of said converter and generates a proportional voltage and a controller having an overvoltage protection circuit associated therewith, said overvoltage protection circuit having a voltage sense input coupled to an output of said converter and a first reference voltage input adapted to receive a first reference voltage, a method of providing current-limiting and short-circuit protection for said converter, comprising:

generating a voltage signal and causing said controller to limit a current supplied by said converter to said output when said proportional voltage exceeds a second reference voltage; and applying said voltage signal to said voltage sense input via a conductive path when said proportional voltage exceeds said second reference voltage, said overvoltage protection circuit causing said controller to disable said converter when a voltage sensed at said voltage sense input exceeds said first reference voltage by a specified value.

9. The method as recited in claim 8 wherein said applying comprises forward biasing a diode in said conductive path when said proportional voltage exceeds said second reference voltage.

10. The method as recited in claim 8 wherein said conductive path comprises a plurality of diodes.

11. The method as recited in claim 8 wherein said applying comprises delaying application of said voltage signal to said overvoltage protection circuit for a specified period of time.

12. The method as recited in claim 8 wherein said generating is performed by an operational amplifier circuit having an operational amplifier and a series-coupled diode and resistor, said operational amplifier circuit coupled between said current sensor and said controller.

13. The method as recited in claim 8 further comprising coupling a latch circuit to said overvoltage protection circuit.

14. The method as recited in claim 8 further comprising coupling a resistor divider network between said output of said converter and said operational amplifier circuit.

15. A power converter, comprising:

a switching network coupled to an input of said power converter;

a filter coupled to an output of said power converter;

a current sensor that senses an output current of said converter and generates a proportional voltage;

a controller having an overvoltage protection circuit with a voltage sense input coupled to said output of said converter and a first reference voltage input adapted to receive a first reference voltage; and an integrated protection circuit, comprising:

an operation amplifier circuit, coupled between said current sensor and said controller, that generates a voltage signal and causes said controller to limit a current supplied by said converter to said output when said proportional voltage exceeds a second reference voltage; and a conductive path, coupled between said operational amplifier circuit and said overvoltage protection circuit, that provides a path to apply said voltage signal to said voltage sense input when said proportional voltage exceeds said second reference voltage, said overvoltage protection circuit causing said controller to disable said converter when a voltage sensed at said voltage sense input exceeds said first reference voltage by a specified value, said integrated protection circuit thereby providing current-limiting and short-circuit protection for said converter.

16. The power converter as recited in claim 15 wherein said conductive path comprises a diode that is forward biased when said proportional voltage exceeds said second reference voltage.

17. The power converter as recited in claim 15 wherein said conductive path comprises a plurality of diodes.

18. The power converter as recited in claim 15 wherein said conductive path comprises a delay circuit that delays application of said voltage signal to said overvoltage protection circuit for a specified period of time.

19. The power converter as recited in claim 15 wherein said operational amplifier circuit further comprises a series-coupled diode and resistor.

20. The power converter as recited in claim 15 further comprising a latch circuit coupled to said overvoltage protection circuit.

21. The power converter as recited in claim 15 further comprising a resistor divider network coupled between said output of said converter and said operational amplifier circuit.

* * * * *